United States Patent
Mabuchi et al.

(10) Patent No.: US 12,291,616 B2
(45) Date of Patent: May 6, 2025

(54) INSULATING VARNISH COMPOSITION, ROTATING MACHINE COIL AND ROTATING MACHINE

(71) Applicant: Mitsubishi Electric Corporation, Tokyo (JP)

(72) Inventors: Takahiro Mabuchi, Tokyo (JP); Xiaohong Yin, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 697 days.

(21) Appl. No.: 17/616,201

(22) PCT Filed: Jul. 16, 2019

(86) PCT No.: PCT/JP2019/027914
§ 371 (c)(1),
(2) Date: Dec. 3, 2021

(87) PCT Pub. No.: WO2021/009842
PCT Pub. Date: Jan. 21, 2021

(65) Prior Publication Data
US 2022/0243020 A1 Aug. 4, 2022

(51) Int. Cl.
C09D 7/40 (2018.01)
C08J 5/24 (2006.01)
C09D 163/00 (2006.01)
H02K 3/30 (2006.01)

(52) U.S. Cl.
CPC .............. C08J 5/241 (2021.05); C09D 7/68 (2018.01); C09D 163/00 (2013.01); H02K 3/30 (2013.01); C08J 2363/02 (2013.01)

(58) Field of Classification Search
CPC ............. C08J 5/24; C09D 163/00; C09D 7/40
USPC ........................................................ 523/400
See application file for complete search history.

(56) References Cited

U.S. PATENT DOCUMENTS

| 2010/0092764 A1* | 4/2010 | Chung ............... B32B 15/14 156/308.2 |
| 2015/0065612 A1 | 3/2015 | Groppel et al. |

FOREIGN PATENT DOCUMENTS

| DE | 102010032555 A1 | 2/2012 | |
| DE | 102012205046 A1 | 10/2013 | |
| DE | 102013201054 A1 | 7/2014 | |
| EP | 2554561 B1 * | 9/2019 | ............ C08G 59/40 |
| JP | 2000-234049 A | 8/2000 | |
| JP | 2006-57017 A | 3/2006 | |
| JP | 2014-222973 A | 11/2014 | |
| JP | 2015-514384 A | 5/2015 | |
| WO | WO-2011118584 A1 * | 9/2011 | ............ C08G 59/40 |

OTHER PUBLICATIONS

International Search Report and Written Opinion mailed on Oct. 15, 2019, received for PCT Application PCT/JP2019/027914, Filed on Jul. 16, 2019, 9 pages including English Translation.
Notice of Reasons for Refusal mailed on Jan. 21, 2020, received for Japanese Patent Application No. 2019-566700, 6 pages including English translation.
Office Action issued on Sep. 30, 2022, in corresponding German patent Application No. 112019007547.0, 8 pages.

* cited by examiner

*Primary Examiner* — Deve V Hall
(74) *Attorney, Agent, or Firm* — XSENSUS LLP (57) ABSTRACT

Provided is an insulating varnish composition, including: two or more kinds of epoxy resins; and a filler having an average primary particle diameter of 500 nm or less, wherein the two or more kinds of epoxy resins contain 80 mass % or more of an epoxy resin having a number of repetitions of 0 in a molecular structural formula thereof with respect to a total mass of the two or more kinds of epoxy resins.

20 Claims, 2 Drawing Sheets

INSULATING VARNISH COMPOSITION, ROTATING MACHINE COIL AND ROTATING MACHINE

CROSS-REFERENCE TO RELATED APPLICATION

The present application is based on PCT filing PCT/JP2019/027914, filed Jul. 16, 2019, the entire contents of which are incorporated herein by reference.

TECHNICAL FIELD

The present invention relates to an insulating varnish composition, and a rotating machine coil and a rotating machine each using the composition.

BACKGROUND ART

A rotating machine to be used in a turbine generator or the like has stator coils stored in a plurality of slots formed on the inner peripheral side of a stator core. The stator coils each include a coil conductor and an insulating layer configured to cover the coil conductor. As a method of forming the insulating layer, there has been known a vacuum pressure impregnation method including: impregnating a mica tape wound around the coil conductor with an insulating varnish composition under reduced pressure; and then heating and pressurizing the tape. In addition, as another method of forming the insulating layer, there has also been known a total impregnation method including: storing the coil conductor having wound therearound the mica tape in each of the slots of the stator core; connecting the conductor to the slot; then impregnating the stator core with the insulating varnish composition under reduced pressure; and then heating the core. The insulating varnish composition is repeatedly used in impregnation treatment, and hence the insulating varnish composition has been desired to have a long pot life.

Further, in recent years, there have been growing demands for the size reduction of the rotating machine and an improvement in efficiency thereof. An electric field to be applied to the insulating layer becomes larger along with the size reduction of the rotating machine and the improvement in efficiency thereof, and hence a stator coil including an insulating layer having high voltage resistance has been desired.

In, for example, Patent Document 1, there is a proposal of an insulating varnish composition including: an epoxy resin having two or more epoxy groups in a molecule thereof; a liquid cyclic acid anhydride; a tetraphenylborate and/or a boron trichloride complex; and an organic acid metal salt. In Patent Document 1, a specific curing agent and a specific curing accelerator are combined to suppress an increase in viscosity of the insulating varnish composition with time, thereby lengthening its pot life.

CITATION LIST

Patent Document

Patent Document 1: JP 2000-234049 A

SUMMARY OF INVENTION

Technical Problem

However, an insulating layer formed by using the insulating varnish composition of Patent Document 1 has involved a problem in that its voltage resistance is insufficient.

Accordingly, the present invention has been made to solve the problem, and an object of the present invention is to provide an insulating varnish composition having a long pot life and capable of forming an insulating layer having high voltage resistance.

Solution to Problem

According to one embodiment of the present invention, there is provided an insulating varnish composition, including: two or more kinds of epoxy resins; and a filler having an average primary particle diameter of 500 nm or less, wherein the two or more kinds of epoxy resins contain 80 mass % or more of an epoxy resin having a number of repetitions of 0 in a molecular structural formula thereof with respect to a total mass of the two or more kinds of epoxy resins.

Advantageous Effects of Invention

According to the present invention, the insulating varnish composition having a long pot life and capable of forming an insulating layer having high voltage resistance can be provided.

DESCRIPTION OF EMBODIMENTS

First Embodiment

An insulating varnish composition according to a first embodiment of the present invention is described. The insulating varnish composition according to the first embodiment includes: two or more kinds of epoxy resins; and a filler having an average primary particle diameter of 500 nm or less. When the filler is dispersed at a desired concentration in the insulating varnish composition, the following tendency is observed: its particles aggregate with time so that the surface energy of the filler may reduce, thereby stabilizing the filler. The tendency is significant in the case of the filler having an average primary particle diameter of 500 nm or less, which has high surface energy. An investigation by the inventors of the present invention has revealed that the aggregation phenomenon is related to the numbers of repetitions in the molecular structural formulae of the epoxy resins. When the numbers of repetitions in the molecular structural formulae are large, an intermolecular interaction occurs between the epoxy resins. In addition, hydroxy groups in the repeating units of the epoxy resins strengthen the intermolecular interaction, and hence the concentration of the epoxy resins increases in a microscopic region of the insulating varnish composition. In that case, a region where the filler having an average primary particle diameter of 500 nm or less can maintain its dispersed state becomes relatively small. As a result, the probability that the particles of the filler having an average primary particle diameter of 500 nm or less are brought into contact with each other may increase to accelerate the aggregation of the particles of the filler having an average primary particle diameter of 500 nm or less. When the particles of the filler having an average primary particle diameter of 500 nm or less aggregate, the aggregate precipitates in the insulating varnish composition. When impregnation treatment is performed with such insulating varnish composition, the filler having an average primary particle diameter of 500 nm or less cannot be arranged in a gap of a mica tape, and hence desired voltage resistance is not obtained.

In view of the foregoing, in the insulating varnish composition according to this embodiment, the content of an epoxy resin having a number of repetitions of 0 in its molecular structural formula is specified to 80 mass % or more with respect to the total mass of the two or more kinds of epoxy resins. In other words, the content of an epoxy resin having a number of repetitions of 1 or more in its molecular structural formula is less than 20 mass % with respect to the total mass of the two or more kinds of epoxy resins. Herein, epoxy resins having different skeletons are regarded as different kinds of epoxy resins, and epoxy resins having different numbers of repetitions in their molecular structural formulae are also regarded as different kinds of epoxy resins. For example, an epoxy resin having a number of repetitions of 0 in its molecular structural formula and an epoxy resin having a number of repetitions of 1 in its molecular structural formula, the resins having the same skeleton, are regarded as two kinds of epoxy resins. When the content of the epoxy resin having a number of repetitions of 0 in its molecular structural formula is set to 80 mass % or more with respect to the total mass of the two or more kinds of epoxy resins, the aggregation of the particles of the filler having an average primary particle diameter of 500 nm or less with time can be suppressed. As a result, the pot life of the insulating varnish composition can be lengthened. The content of the epoxy resin having a number of repetitions of 0 in its molecular structural formula is preferably from 80 mass % to 90 mass % with respect to the total mass of the two or more kinds of epoxy resins.

Specific examples of the epoxy resins to be used in this embodiment include: an epoxy resin having a bisphenol A skeleton; an epoxy resin having a bisphenol F skeleton; an epoxy resin having a bisphenol S skeleton; an epoxy resin having a biphenol skeleton; an epoxy resin having a phenol novolac skeleton; and an epoxy resin having a cresol novolac skeleton. Those epoxy resins have skeletons different from each other. In the insulating varnish composition according to this embodiment, two or more kinds of epoxy resins need to be used, and three kinds of epoxy resins having different skeletons are preferably used. From the viewpoints of improving the heat resistance, adhesive property, electrical insulating property, and mechanical strength of an insulating layer, and further suppressing the aggregation of the particles of the filler in the insulating varnish composition, the epoxy resin having the bisphenol A skeleton, the epoxy resin having the bisphenol F skeleton, and an epoxy resin having a tetramethylbiphenol skeleton are more preferably used. Herein, the epoxy resin having the bisphenol A skeleton has the following molecular structural formula (1). In the following molecular structural formula (1), "n" represents the number of repetitions, and represents an integer of 0 or more.

(1)

The epoxy resin having the bisphenol F skeleton has the following molecular structural formula (2). In the following molecular structural formula (2), "n" represents the number of repetitions, and represents an integer of 0 or more.

(2)

The epoxy resin having the tetramethylbiphenol skeleton has the following molecular structural formula (3). In the following molecular structural formula (3), "n" represents the number of repetitions, and represents an integer of 0 or more.

In the insulating varnish composition according to this embodiment, from the viewpoints of improving the heat resistance of the insulating layer and improving the impregnability of the insulating varnish composition, the ratio of the mass of the epoxy resin having the bisphenol A skeleton to the mass of the epoxy resin having the bisphenol F skeleton, that is, the ratio "mass of epoxy resin having bisphenol A skeleton/mass of epoxy resin having bisphenol F skeleton" is preferably from 0.6 to 1.4, more preferably from 0.8 to 1.2.

In the insulating varnish composition according to this embodiment, from the viewpoints of improving the adhesive property of the insulating layer and preventing the deposition of the epoxy resin having the tetramethylbiphenol skeleton in the insulating varnish composition, the ratio of the mass of the epoxy resin having the bisphenol A skeleton to the mass of the epoxy resin having the tetramethylbiphenol skeleton, that is, the ratio "mass of epoxy resin having bisphenol A skeleton/mass of epoxy resin having tetramethylbiphenol skeleton" is preferably from 2 to 8, more preferably from 4 to 6.

In addition, from the viewpoint of further improving the heat resistance of the insulating varnish composition, an epoxy resin containing three or more epoxy groups in its molecular structural formula may be used in combination with the above-mentioned epoxy resins.

Although the filler to be used in this embodiment is not particularly limited as long as the filler has an average primary particle diameter of 500 nm or less, the filler is preferably solid particles having insulating properties. Examples of a material for the filler include silica, aluminum oxide, magnesium oxide, boron nitride, aluminum nitride, magnesium hydroxide, calcium carbonate, and magnesium carbonate. When the average primary particle diameter of the filler is more than 500 nm, at the time of the impregnation of the insulating varnish composition into the mica tape, the filler cannot be uniformly filled thereinto, and hence desired voltage resistance is not obtained. The average primary particle diameter of the filler is preferably from 10 nm to 500 nm. Herein, the average primary particle diameter of the filler is an average particle diameter measured with a laser diffraction/scattering type particle size distribution apparatus, such as MICROTRAC MT3300.

From the viewpoint of improving an adhesive property between the filler having an average primary particle diameter of 500 nm or less and each of the epoxy resins, the surface of the filler having an average primary particle diameter of 500 nm or less may be treated with a coupling agent. When the filler having an average primary particle diameter of 500 nm or less and the epoxy resin are strongly bonded to each other, the voltage resistance of the insulating layer can be further improved. The coupling agent may be appropriately selected in accordance with the material for the filler having an average primary particle diameter of 500 nm or less. Specific examples of the coupling agent include 3-glycidoxypropylmethyldimethoxysilane, 3-glycidoxypropyltrimethoxysilane, 3-glycidoxypropylmethyldiethoxysilane, 3-glycidoxypropyltriethoxysilane, 2-(3,4-epoxycyclohexyl)ethyltrimethoxysilane, p-styryltrimethoxysilane, 3-methacryloxypropylmethyldimethoxysilane, 3-methacryloxypropyltrimethoxysilane, 3-methacryloxypropylmethyldiethoxysilane, and 3-methacryloxypropyltriethoxysilane. Those coupling agents may be used alone or in combination thereof.

From the viewpoint of securing the impregnability of the insulating varnish composition, the content of the filler having an average primary particle diameter of 500 nm or less is preferably from 1 mass % to 60 mass %, more preferably from 2 mass % to 20 mass % with respect to the insulating varnish composition. When the content of the filler having an average primary particle diameter of 500 nm or less falls within the ranges, an increase in viscosity of the insulating varnish composition can be suppressed.

A curing agent may be added to the insulating varnish composition according to this embodiment. Although the curing agent is not particularly limited as long as the agent can react with the epoxy resins to cure the epoxy resins, an agent that is liquid at normal temperature is preferred. Specific examples of the curing agent include acid anhydrides, such as hexahydrophthalic anhydride, tetrahydrophthalic anhydride, methylhexahydrophthalic anhydride, methyltetrahydrophthalic anhydride, and methyl nadic anhydride. Those curing agents may be used alone or in combination thereof.

From the viewpoint of properly advancing the curing reactions of the epoxy resins, the addition amount of the curing agent is preferably from 10 parts by mass to 150 parts by mass, more preferably from 30 parts by mass to 120 parts by mass, most preferably from 50 parts by mass to 100 parts by mass with respect to 100 parts by mass of the total of the two or more kinds of epoxy resins.

A curing catalyst may be added to the insulating varnish composition according to this embodiment. The curing catalyst is not particularly limited as long as the catalyst can accelerate a reaction between each of the epoxy resins and the curing agent. Specific examples of the curing catalyst include a tetraphenylborate, a boron-amine complex, an organic acid metal salt, and a quaternary ammonium salt. From the viewpoint of further accelerating the reaction between the epoxy resin and the curing agent while securing the pot life of the insulating varnish composition, a combination of the organic acid metal salt and the boron-amine complex is preferably used as the curing catalyst, and the organic acid metal salt and the boron-amine complex are more preferably used so that their mass ratio may be from 10:1 to 3:1.

From the viewpoint of further accelerating the reaction between each of the epoxy resins and the curing agent while securing the pot life of the insulating varnish composition, the addition amount of the curing catalyst is preferably from 0.01 part by mass to 0.5 part by mass, more preferably from 0.05 part by mass to 0.2 part by mass with respect to 100 parts by mass of the total of the two or more kinds of epoxy resins.

Specific examples of the boron-amine complex include triphenylphosphine-triphenylborane, boron trifluoride monoethylamine, boron trifluoride-piperidine, boron trifluoride-aniline, a boron trichloride-N,N-dimethyloctylamine complex, a boron trichloride-N,N-diethyldioctylamine complex, and a boron trichloride-octylamine complex.

Specific examples of the organic acid metal salt include zinc octylate, tin octylate, zinc naphthenate, and cobalt naphthenate.

A reactive diluent may be added to the insulating varnish composition according to this embodiment. Specific examples of the reactive diluent include a styrene monomer, a monomer obtained by substituting at least one hydrogen atom of the benzene ring of styrene with a hydrocarbon group, and a (meth)acrylic monomer. Those reactive diluents may be used alone or in combination thereof.

The (meth)acrylic monomer is not particularly limited as long as the monomer does not inhibit the curing reactions of the epoxy resins, and a linear (meth)acrylate, a branched (meth)acrylate, a cyclic (meth)acrylate, or the like may be used. Of those, the linear (meth)acrylate is preferably used from the viewpoint of preventing a reduction in heat resistance of the insulating layer. Specific examples of the linear (meth)acrylate include 2-ethylhexyl acrylate, cyclohexyl acrylate, diethylene glycol mono(2-ethylhexyl) ether acrylate, diethylene glycol monophenyl ether acrylate, tetraethylene glycol monophenyl ether acrylate, trimethylolpropane triacrylate, lauryl acrylate, lauryl methacrylate, isobornyl acrylate, isobornyl methacrylate, 2-phenoxyethyl acrylate, tetrahydrofurfuryl acrylate, 2-hydroxypropyl acrylate, benzyl acrylate, tetrahydrofurfuryl methacrylate, 2-hydroxyethyl methacrylate, benzyl methacrylate, cyclohexyl methacrylate, and 2-(2,4,6-tribromophenoxy)ethyl acrylate. Those linear (meth)acrylates may be used alone or in combination thereof.

The addition amount of the reactive diluent only needs to be appropriately adjusted to the extent that the heat resistance of the insulating layer is not reduced. When the reactive diluent is added to the insulating varnish composition, its addition amount is preferably from 20 parts by mass to 310 parts by mass, more preferably from 30 parts by mass to 250 parts by mass with respect to 100 parts by mass of the total of the two or more kinds of epoxy resins having different skeletons.

In addition, a radical initiator may be further added to the insulating varnish composition for accelerating the polymerization rection of the reactive diluent. Specific examples of the radical initiator include: peroxides, such as benzoyl peroxide, diisopropyl peroxycarbonate, lauroyl peroxide, dicumyl peroxide, and t-butyl peroxypivalate; and azo compounds, such as azoisobutyronitrile and 2,2'-azobis(2-methylbutyronitrile).

In the insulating varnish composition according to the first embodiment, the monodispersed state of the filler having an average primary particle diameter of 500 nm or less is maintained over a long time period, and hence the following effect is exhibited: the pot life of the composition is long. Further, the insulating varnish composition according to the first embodiment can form an insulating layer having high voltage resistance, and hence may be applied to the coil of a rotating machine, such as a rotating machine for a generator, a rotating machine for general industry, or a rotating machine for a vehicle.

Second Embodiment

Figure 1:
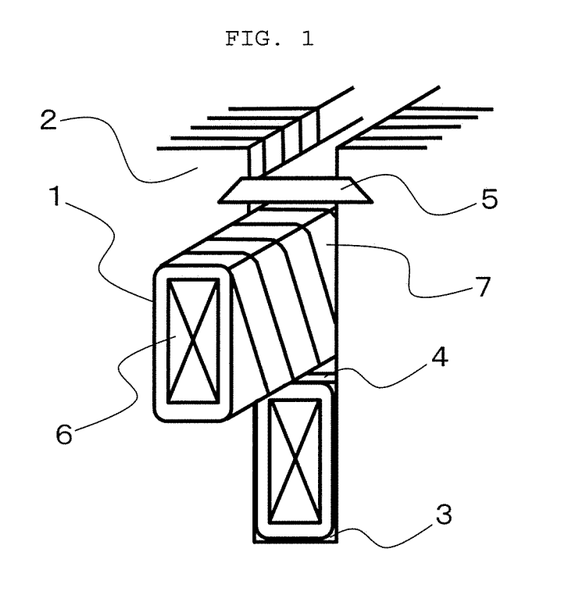
FIG. 1 is a schematic perspective view of the stator of a rotating machine having incorporated thereinto a rotating machine coil according to a second embodiment.

FIG. 1 is a schematic perspective view for illustrating part of the stator of a rotating machine having incorporated thereinto a rotating machine coil according to a second embodiment in an enlarged manner. In the stator of the rotating machine illustrated in FIG. 1, rotating machine coils 1 are stored in two upper and lower stages in a plurality of slots 3 formed on the inner peripheral side of a stator core 2. A spacer 4 is inserted between the upper rotating machine coil 1 and the lower rotating machine coil 1. A wedge 5 for fixing the rotating machine coil 1 is inserted into an opening end portion of each of the slots 3. The wedge 5 exhibits a suppressing effect on electromagnetic vibration generated from the rotating machine coil 1 at the time of the operation of the rotating machine. The outer periphery of a coil conductor 6 is covered with an insulating layer 7, and hence ground insulation between the conductor and the stator core 2 is secured. The sectional shape of the coil conductor 6 is a rectangle. For example, a product obtained by bundling a plurality of metal wires having rectangular sectional shapes may be used as the coil conductor 6. Examples of a material for the metal wires include copper, aluminum, and silver.

Figure 2:
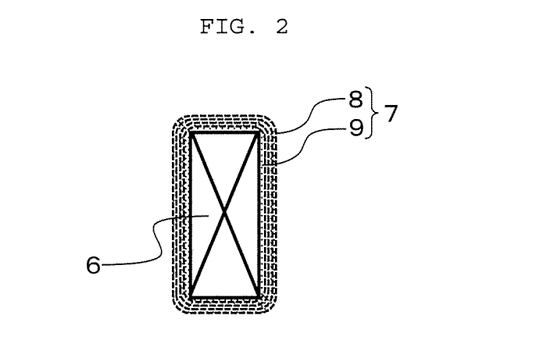
FIG. 2 is a schematic sectional view of the rotating machine coil according to the second embodiment.

FIG. 2 is a schematic sectional view of the rotating machine coil 1 according to this embodiment. In FIG. 2, the rotating machine coil 1 includes the coil conductor 6 and the insulating layer 7 configured to cover the coil conductor 6. The insulating layer 7 is formed of a mica tape 8 wound around the outer periphery of the coil conductor 6 a plurality of times and a cured product 9 of an insulating varnish composition impregnated into the mica tape 8. In this embodiment, a product obtained by curing the insulating varnish composition described in the first embodiment through heating is used as the cured product 9 of the insulating varnish composition.

The mica tape 8 to be used in the rotating machine coil 1 according to this embodiment includes a mica layer obtained by the lamination of mica particles and a fiber reinforcement layer bonded onto the mica layer. That is, the mica tape 8 has a two-layer structure formed of the mica layer and the fiber reinforcement layer. The mica particles each have a flaky shape, and are hence laminated in the thickness direction of the insulating layer 7.

The mica particles each contain, as main components, hard mica and soft mica that are layered silicate minerals. Examples of the forms of the mica particles include block mica, mica splittings, and reconstituted mica. Of those, the reconstituted mica is preferably used from the viewpoint that the reconstituted mica has a uniform thickness and has an economic advantage. From the viewpoint of improving the voltage resistance of the insulating layer 7, the content of the mica particles is preferably from 60 g to 200 g per 1 $m^2$ of the mica tape 8. When the content of the mica particles is less than 60 g/$m^2$, the voltage resistance of the insulating layer 7 may be poor. Meanwhile, when the content of the mica particles is more than 200 g/$m^2$, the voltage resistance is excellent, but the thermal resistance of the insulating layer 7 may increase with increasing thickness of the mica tape 8.

The fiber reinforcement layer plays a role not only of holding the strength of the mica tape 8 or improving the mechanical strength of the insulating layer 7 but also as an impregnation channel at the time of the impregnation of the insulating varnish composition into the mica tape 8. The fiber reinforcement layer is not particularly limited as long as the layer plays those roles. Examples of the kinds of fibers for forming the fiber reinforcement layer include glass fibers, alumina fibers, and polyamide fibers. A fiber reinforcement layer including the glass fibers out of those fibers is preferably used from the viewpoint that the layer is excellent in characteristics and price. In addition, examples of a method of weaving the fibers include plain weaving, twill weaving, and leno weaving. A fiber reinforcement layer obtained by subjecting the fibers to plain weaving is preferably used from the viewpoint that the ratio of the porosity of the fiber reinforcement layer to the thickness thereof can be made larger. In addition, the fiber reinforcement layer including the glass fibers is preferably obtained by subjecting glass plied yarns obtained by braiding glass single yarns to plain weaving from the viewpoint of improving the impregnability of the insulating varnish composition. In particular, the number of the warps of the glass plied yarns and the number of the wefts thereof are each preferably from 10 to 60 per 1 square inch. When the number of the warps and that of the wefts are each less than 10 per 1 square inch, it becomes difficult to hold the strength of the mica tape 8. As a result, the mica tape 8 may break at the time of the winding of the mica tape 8 around the coil conductor 6. Meanwhile, when the number of the warps and that of the wefts are each more than 60 per 1 square inch, the porosity of the fiber reinforcement layer may become smaller to reduce the impregnability of the insulating varnish composition.

In addition, the surfaces of the glass fibers may be treated with a coupling agent for improving the impregnability of the insulating varnish composition and improving the mechanical strength of the insulating layer 7. However, the treatment with the coupling agent may reduce the strength of each of the glass fibers themselves. In addition, in a production process for the glass fibers, amylum, starch, or the like adheres to the surfaces of the glass fibers. Such adhering substance reduces the voltage resistance of the insulating layer 7, and hence the total amount of the adhering substance is preferably 5 mass % or less with respect to the glass fibers. When the total amount of the adhering substance is more than 5 mass %, peeling may occur between the cured product 9 of the insulating varnish composition and each of the glass fibers to reduce the insulating property of the insulating layer. Herein, the total amount of the adhering substance can be determined from a reduction in mass of the glass fibers at the time of their heating at 900° C. for 30 hours.

Next, a method of producing the rotating machine coil according to this embodiment is described. Examples of a method of forming the insulating layer 7 configured to cover the coil conductor 6 include a vacuum pressure impregnation method, a total impregnation method, and a resin-rich method. A case in which the vacuum pressure impregnation method is adopted is described below.

The mica tape 8 is wound around the outer periphery of the coil conductor 6 a plurality of times so that some parts of the tape may overlap each other. Next, under a reduced-pressure atmosphere, the mica tape 8 wound around the coil conductor 6 is impregnated with the insulating varnish composition described in the first embodiment. After that, the insulating varnish composition is impregnated into the tape under pressure as required. Finally, under a state in which the pressure of air surrounding the tape is set to normal pressure, the insulating varnish composition is heated at a temperature of from 120° C. to 180° C. for from 4 hours to 28 hours to be cured. The rotating machine coil according to this embodiment can be produced through such process.

The rotating machine coil according to the second embodiment has excellent voltage resistance because the filler having an average primary particle diameter of 500 nm or less is uniformly dispersed in its insulating layer.

Third Embodiment

Figure 3:
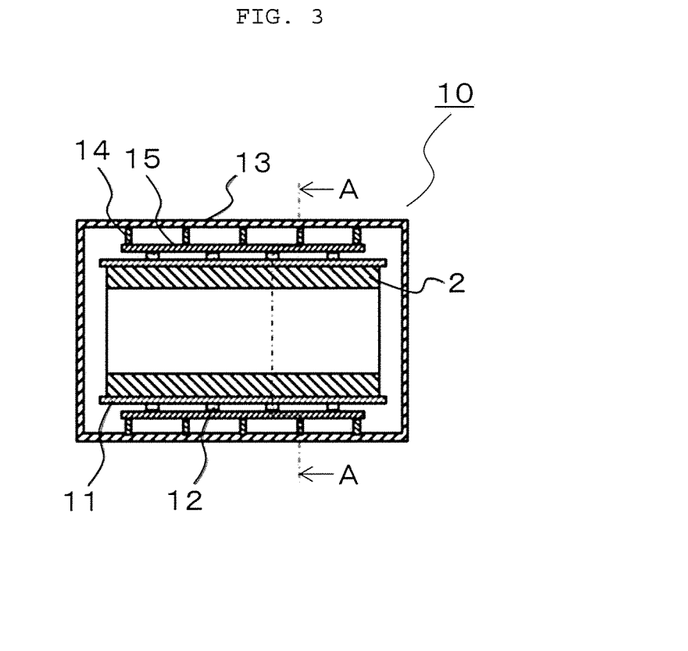
FIG. 3 is a schematic view of a rotating machine according to a third embodiment.
Figure 4:
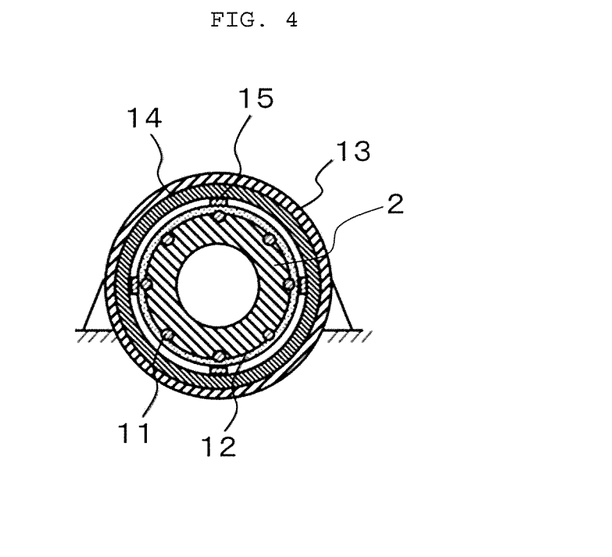
FIG. 4 is a schematic view of the rotating machine according to the third embodiment.

FIG. 3 is a schematic sectional view along the rotating shaft of a rotating machine according to a third embodiment. FIG. 4 is a schematic view of a section perpendicular to the rotating shaft of the rotating machine according to the third embodiment viewed from a direction indicated by the arrow A of FIG. 3.

In each of FIG. 3 and FIG. 4, a rotating machine 10 of this embodiment includes: a rotor core (not shown); the cylindrical stator core 2 configured to surround the rotor core; a plurality of core fastening members 11; a plurality of holding rings 12; a frame 13; a plurality of inner frame members 14; and a plurality of elastic supporting members 15. In the inner peripheral portion of the stator core 2, a plurality of slots formed in the axial direction thereof are arranged in the peripheral direction thereof, though the slots are not shown in FIG. 3 and FIG. 4. The rotating machine coil described in the second embodiment is stored in each of the slots. Although the eight core fastening members 11 are used in each of FIG. 3 and FIG. 4, the number of the core fastening members 11 is not limited thereto. Although the holding rings 12 are arranged at four sites in each of FIG. 3 and FIG. 4, the number of the holding rings 12 is not limited thereto. Although the inner frame members 14 are arranged at five sites in each of FIG. 3 and FIG. 4, the number of the inner frame members 14 is not limited thereto. The four elastic supporting members 15 are used, but the number of the elastic supporting members 15 is not limited thereto. The core fastening members 11 are arranged in the outer peripheral portion of the core fastening members 11 in the peripheral direction thereof at intervals. In addition, the core fastening members 11 fasten the stator core 2. The holding rings 12 are each formed into a flat shape in the axial direction. The holding rings 12 are arranged in the outer peripheral portion of the stator core 2 in the axial direction at intervals. In addition, the holding rings 12 hold the stator core 2 by fastening the core from the outer peripheries of the core fastening members 11. The frame 13 is formed into a cylindrical shape, and surrounds the periphery of the stator core 2 with a space therebetween. The inner frame members 14 are each formed into a ring shape, and protrude from the inner surface of the frame 13 toward a shaft center while being arranged at intervals in the axial direction. Each of the elastic supporting members 15 is formed of a spring plate mutually fixed to the adjacent inner frame members 14 and fixed to the holding rings 12 in its central portion in the axial direction. The rotating machine illustrated in each of FIG. 3 and FIG. 4 may be applied to, for example, a turbine generator including an armature.

In the rotating machine according to the third embodiment, the voltage resistance of the rotating machine coil is improved. Accordingly, a further size reduction of the rotating machine and a further increase in output thereof can be achieved.

EXAMPLES

The present invention is specifically described below by way of Examples and Comparative Examples. However, the present invention is not limited to Examples below.

Example 1

24 Parts by mass of a bisphenol A-type epoxy resin in which the content of an epoxy resin having a number of repetitions of 0 was 90 mass %, 24 parts by mass of a bisphenol F-type epoxy resin in which the content of an epoxy resin having a number of repetitions of 0 was 90 mass %, 5 parts by mass of tetramethylbiphenol diglycidyl ether in which the content of an epoxy resin having a number of repetitions of 0 was 90 mass %, 46.91 parts by mass of methyltetrahydrophthalic anhydride, 0.08 part by mass of zinc octylate, and 0.01 part by mass of a boron trichloride-N,N-diethyldioctylamine complex were mixed. Next, silica having an average primary particle diameter of 100 nm was added to the mixture so that its content became 5 mass % with respect to an insulating varnish composition to be obtained. After that, high-speed rotation stirring treatment was performed to monodisperse the silica. Thus, an insulating varnish composition of Example 1 was prepared. The number of repetitions of each of the epoxy resins was calculated from the area ratio of a molecular weight distribution obtained by gel permeation chromatography (GPC) widely used as a method of measuring the molecular weight of a polymer. In addition, a product obtained through the purification of a commercial epoxy resin, such as JER828 manufactured by Mitsubishi Chemical Corporation serving as a bisphenol A-type epoxy resin, by a distillation method was used as each of the epoxy resins. In addition, the average primary particle diameter of the silica was measured with MICROTRAC MT3300.

Examples 2 to 4

Insulating varnish compositions of Examples 2 to 4 were each prepared in the same manner as in Example 1 except that the composition of Example 1 was changed to composition shown in Table 1.

Comparative Example 1

An insulating varnish composition of Comparative Example 1 was prepared in the same manner as in Example 1 except that the silica having an average primary particle diameter of 100 nm was not added.

Comparative Examples 2 to 5

Insulating varnish compositions of Comparative Examples 2 to 5 were each prepared in the same manner as in Example 1 except that the composition of Example 1 was changed to composition shown in Table 1.

To evaluate the pot life of each of the insulating varnish compositions, the insulating varnish composition was left to stand in a thermohygrostat at a temperature of 40° C. and a relative humidity of 35%, and a change in viscosity of the insulating varnish composition with time was measured with an E-type viscometer manufactured by Toki Sangyo Co., Ltd. The number of days required for the viscosity of the insulating varnish composition to reach a value twice as high as its initial value was adopted as the pot life. The results are shown in Table 1.

In addition, as in the above-mentioned viscosity measurement, each of the insulating varnish compositions was left to stand in a thermohygrostat at a temperature of 40° C. and a relative humidity of 35%, and the insulating varnish composition removed from the thermohygrostat was heated to be cured. To evaluate the dispersed state of the silica, a section of the cured product was observed with an electron microscope, and the number of days required for the aggregation of the particles of the silica to occur was evaluated. The results are shown in Table 1.

In addition, each of the insulating varnish compositions immediately after their preparation was impregnated into a mica tape, and was then heated at 150° C. for 12 hours to be cured. Thus, a sample simulating a rotating machine coil was produced. The dielectric breakdown voltage of the sample was determined in conformity with JIS C2110. The dielectric breakdown voltages of the samples obtained by using the respective insulating varnish compositions of Examples 1 to 4 and Comparative Examples 2 to 5 are shown in Table 1 as relative values when the dielectric breakdown voltage of the sample obtained by using the insulating varnish composition of Comparative Example 1 is defined as 1.

TABLE 1

| | | Example | | | | Comparative Example | | | | |
|---|---|---|---|---|---|---|---|---|---|---|
| | | 1 | 2 | 3 | 4 | 1 | 2 | 3 | 4 | 5 |
| Insulating varnish composition | Bisphenol A-type epoxy resin (90 mass %)* | 24 | | | | 24 | | | 24 | |
| | Bisphenol A-type epoxy resin (80 mass %)* | | 24 | 24 | 53 | | | | | |
| | Bisphenol A-type epoxy resin (75 mass %)* | | | | | | | 24 | | 53 |
| | Bisphenol A-type epoxy resin (10 mass %)* | | | | | | | | | 24 |
| | Bisphenol F-type epoxy resin (90 mass %)* | 24 | | | | 24 | | | 24 | |
| | Bisphenol F-type epoxy resin (80 mass %)* | | 24 | 24 | | | | | 24 | |
| | Bisphenol F-type epoxy resin (75 mass %)* | | | | | | | 24 | | |
| | Tetramethylbiphenol diglycidyl ether (90 mass %)* | 5 | | | | 5 | | | 5 | |

TABLE 1-continued

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
|  | Tetramethylbiphenol diglycidyl ether (80 mass %)* |  | 5 | 5 |  |  |  | 5 |  |  |
|  | Tetramethylbiphenol diglycidyl ether (75 mass %)* |  |  |  |  |  | 5 |  |  |  |
|  | Methyltetrahydrophthalic anhydride | 46.91 | 46.91 | 46.91 | 46.91 | 46.91 | 46.91 | 46.91 | 46.91 | 46.91 |
|  | Zinc octylate | 0.08 | 0.08 | 0.08 | 0.08 | 0.08 | 0.08 | 0.08 | 0.08 | 0.08 |
|  | Boron trichloride-N,N-diethyldioctylamine complex | 0.01 | 0.01 | 0.01 | 0.01 | 0.01 | 0.01 | 0.01 | 0.01 | 0.01 |
|  | Silica having an average primary particle diameter of 100 nm | 5 | 5 |  |  |  | 5 | 5 |  |  |
|  | Silica having an average primary particle diameter of 500 nm |  |  | 5 | 5 |  |  |  |  | 5 |
|  | Silica having an average primary particle diameter of 550 nm |  |  |  |  |  |  |  | 5 |  |
| Evaluation | Pot life (number of days) | 120 | 119 | 119 | 124 | 120 | 118 | 112 | 120 | 120 |
|  | Occurrence of aggregation (number of days) | 110 | 108 | 110 | 119 | — | 53 | 37 | 109 | 45 |
|  | Relative value of dielectric breakdown voltage | 1.5 | 1.5 | 1.4 | 1.4 | 1 | 1.4 | 1.5 | 1.1 | 1.4 |

*A numerical value represented in the unit of mass % in parentheses represents the content of an epoxy resin in which n = 0.

It can be recognized from comparison between the result of Example 1 and the result of Comparative Example 1 that the use of the insulating varnish composition having added thereto the filler having an average primary particle diameter of 500 nm or less increases the dielectric breakdown voltage of the sample simulating a rotating machine coil.

In addition, it is understood from comparison between the results of Examples 1 to 3, and the results of Comparative Examples 2 and 3 that in each of the insulating varnish compositions in each of which the content of the epoxy resin having a number of repetitions of 0 in its molecular structural formula is 80 mass %, the occurrence of the aggregation of the particles of the filler is significantly suppressed.

Further, it is understood from comparison between the result of Example 1 and the result of Comparative Example 4 that the use of the insulating varnish composition having added thereto the filler having an average primary particle diameter of more than 500 nm remarkably reduces the dielectric breakdown voltage of the sample simulating a rotating machine coil.

REFERENCE SIGNS LIST 1 rotating machine coil
2 stator core
3 slot
4 spacer
5 wedge
6 coil conductor
7 insulating layer
8 mica tape
9 cured product of insulating varnish composition
10 rotating machine
11 core fastening member
12 holding ring
13 frame
14 inner frame member
15 elastic supporting member

The invention claimed is:

1. An insulating varnish composition, comprising:
   two or more epoxy resins having different skeletons or different numbers of repetitions in a molecular structural formulae; and
   a filler having an average primary particle diameter of 500 nm or less,
   wherein the two or more epoxy resins contain 80 mass % or more of an epoxy resin having a number of repetitions of 0 in a molecular structural formula thereof with respect to a total mass of the two or more epoxy resins,
   wherein the two or more epoxy resins contain an epoxy resin having a bisphenol A skeleton, an epoxy resin having a bisphenol F skeleton, and an epoxy resin having a tetramethylbiphenol skeleton.

2. The insulating varnish composition according to claim 1, wherein a ratio of a mass of the epoxy resin having the bisphenol A skeleton to a mass of the epoxy resin having the bisphenol F skeleton is from 0.6 to 1.4.

3. The insulating varnish composition according to claim 1, wherein a ratio of a mass of the epoxy resin having the bisphenol A skeleton to a mass of the epoxy resin having the tetramethylbiphenol skeleton is from 2 to 8.

4. The insulating varnish composition according to claim 2, wherein a ratio of a mass of the epoxy resin having the bisphenol A skeleton to a mass of the epoxy resin having the tetramethylbiphenol skeleton is from 2 to 8.

5. The insulating varnish composition according to claim 1, further comprising 10 parts by mass to 150 parts by mass of a curing agent with respect to 100 parts by mass of a total of the two or more epoxy resins.

6. The insulating varnish composition according to claim 2, further comprising 10 parts by mass to 150 parts by mass of a curing agent with respect to 100 parts by mass of a total of the two or more epoxy resins.

7. The insulating varnish composition according to claim 3, further comprising 10 parts by mass to 150 parts by mass of a curing agent with respect to 100 parts by mass of a total of the two or more epoxy resins.

8. The insulating varnish composition according to claim 4, further comprising 10 parts by mass to 150 parts by mass of a curing agent with respect to 100 parts by mass of a total of the two or more epoxy resins.

9. The insulating varnish composition according to claim 1, further comprising 0.01 part by mass to 0.5 part by mass of a curing catalyst with respect to 100 parts by mass of a total of the two or more epoxy resins.

10. The insulating varnish composition according to claim 2, further comprising 0.01 part by mass to 0.5 part by mass of a curing catalyst with respect to 100 parts by mass of a total of the two or more epoxy resins.

11. The insulating varnish composition according to claim 3, further comprising 0.01 part by mass to 0.5 part by mass of a curing catalyst with respect to 100 parts by mass of a total of the two or more epoxy resins.

12. The insulating varnish composition according to claim 4, further comprising 0.01 part by mass to 0.5 part by mass of a curing catalyst with respect to 100 parts by mass of a total of the two or more epoxy resins.

13. The insulating varnish composition according to claim 5, further comprising 0.01 part by mass to 0.5 part by mass of a curing catalyst with respect to 100 parts by mass of a total of the two or more epoxy resins.

14. The insulating varnish composition according to claim 6, further comprising 0.01 part by mass to 0.5 part by mass of a curing catalyst with respect to 100 parts by mass of a total of the two or more epoxy resins.

15. The insulating varnish composition according to claim 7, further comprising 0.01 part by mass to 0.5 part by mass of a curing catalyst with respect to 100 parts by mass of a total of the two or more epoxy resins.

16. The insulating varnish composition according to claim 8, further comprising 0.01 part by mass to 0.5 part by mass of a curing catalyst with respect to 100 parts by mass of a total of the two or more epoxy resins.

17. The insulating varnish composition according to claim 1, wherein a content of the filler is from 1 mass % to 60 mass % with respect to the insulating varnish composition.

18. The insulating varnish composition according to claim 2, wherein a content of the filler is from 1 mass % to 60 mass % with respect to the insulating varnish composition.

19. A rotating machine coil, comprising:
a coil conductor; and
an insulating layer configured to cover the coil conductor,
wherein the insulating layer is formed of a mica tape wound around the coil conductor and a cured product of the insulating varnish composition of claim 1 impregnated into the mica tape.

20. A rotating machine, comprising:
a rotor core; and
a stator core,
wherein the rotating machine coil of claim 19 is stored in a slot of the stator core.

* * * * *